Patented May 16, 1950

2,507,782

UNITED STATES PATENT OFFICE 2,507,782

RECTIFIERS

Mac Goodman, New York, N. Y., assignor to Radio Receptor Company, Inc., New York, N. Y., a corporation of New York No Drawing. Application February 23, 1946, Serial No. 649,746

6 Claims. (Cl. 175—366)

This invention relates to improvements in barrier layer cells being particularly directed to dry disc rectifiers of the selenium plate type.

Broadly it is an object of my invention to provide a barrier layer between the semi-conductor and conductor of a rectifier plate by means of a chemical treatment applied to the surface of the semi-conductor and wherein the end product barrier constitutes a salt of an acid of an element among those in groups 5 and 6 in the short III period or in the B subgroups of the long periods of the periodic system.

Specifically, it is an object of this invention to form a barrier layer in a selenium type dry disc rectifier by treatment of the exposed surface of the selenium layer with a solution of an acid of an element among those in groups 5 and 6 in the short III period or in the B subgroups of the long periods of the periodic system, either simultaneously with or followed by the application of an alkaline medium, the end product upon drying defining a continuous layer of the alkaline salt of the acids of the aforesaid group.

By way of illustration of the application of my process with respect to the salts of the acids of the elements of the respective groups, of the periodic system, I refer in detail to the embodiment of my invention with respect to a particular element of each group. For example, phosphorous in group 5 and selenium or tellurium in group 6.

In each instance, I prepare the rectifier plate in the usual manner, that is, I mount by heat and pressure or analogous process, a layer of amorphous selenium and then I anneal.

In applying my embodiment involving an element of short period III of group 5 of the periodic system, I take a .1 molar solution of phosphoric acid and spray the same onto the exposed selenium surface, or in the alternative, dip the selenium surface into a vessel carrying this acid. The thus-treated plate is permitted to drain at which time there remains on the surface of the selenium a thin adherent film of aqueous phosphoric acid. The thus-treated plate is then exposed to an atmosphere containing ammonia gas for a period of 30 seconds and then the plate is dried at a temperature of between 100° and 120° C. for 3 minutes. The film which is now in fact a layer of ammonium phosphate becomes on drying, a continuous layer of ammonium phosphate.

I then superimpose upon the aforesaid barrier layer of ammonium phosphate a conductive layer of low melting alloy such as cadmium, tin, bismuth eutectic having a melting point of about 103° C.

The plate which carries the barrier layer of ammonium phosphate between the semi-conductive layer of selenium and the conductive layer of counter-electrode material is now subjected to the action of an electric current employed in the reverse direction, whereupon the "insulating" ammonium phosphate layer becomes electroformed to the point at which it will withstand high values of reverse voltages without breakdown.

Another particular embodiment of my invention as applied with respect to the salt of an acid of an element in group 6 of the periodic system is that wherein I spray or dip the rectifier plate carrying the annealed selenium layer with or in a solution of selenium or tellurium dioxide at .3 molar concentration. In this procedure I may, as in the case of the phosphoric acid salt introduce the alkaline cation by simultaneous intermixture in aqueous solution or subsequent fuming with ammonia gas.

I have found generally that salts of acids of the various elements in groups 5 and 6 in the short III period or in the B subgroups of the long periods of the periodic system namely, phosphorous, sulphur, arsenic, selenium, antimony, tellurium and bismuth, as for example, the arsenites and arsenates, the stibnites and stibnates, the bismuthates as well as the phosphates in the 5th group; and the sulphates as well as the selenites and selenates and tellurites and tellurates in the 6th group, form a satisfactory barrier layer, and that such barrier layer formation is at its greatest efficiency when the alkaline medium defining the cation of the end product salt is applied in sufficient quantum to establish the requisite pH for the respective treating acid solution, which, with respect to the selenites, is between 4 and 5.

I have found that the best media for introducing the alkaline cation into the barrier layer, comprises alkaline reacting compounds which incorporate the ammonia radical and have a high vapor pressure so as to provide effective formation of a compound forming an alkaline cation. Among this group are ammonia, methylamine, ethylamine, ethylene diamine, and cyclohexylamines.

I have not given any details as to the apparatus for carrying out the spraying, dipping and fuming, it being within the province of this invention to apply any one or all of these steps in connection with the acids of elements of groups 5 and 6 in the short III period or in the B subgroups of the long periods of the periodic system so as to dispose between the selenium semi-conductive layer and the alloy-conductive layer, a highly resistant adherent continuous insulating film of a salt of an acid of the elements within the groups aforesaid.

I claim:

1. In the manufacture of selenium rectifiers a method of forming a barrier layer in a selenium-coated plate, comprising treating the surface of the selenium coating with an acid of an element taken from the group consisting of the elements in groups 5 and 6, in the short III period and in the B subgroups of the long periods of the periodic system, and thereafter treating said surface with an alkali to form a film having a pH between 4 and 5.

2. In the manufacture of selenium rectifiers, a method of forming a barrier layer in a selenium-coated plate, comprising covering the surface of the selenium layer with a film of a solution of an acid of an element taken from the group consisting of the elements in groups 5 and 6, in the short III period and in the B subgroups of the long periods of the periodic system, and exposing said film-covered surface to the action of an alkali to form a film having a pH between 4 and 5.

3. In the manufacture of selenium rectifiers, a method of forming a barrier layer in a selenium-coated plate, comprising covering the surface of the selenium layer with a film of a solution of an acid of an element taken from the group consisting of the elements in groups 5 and 6, in the short III period and in the B subgroups of the long periods of the periodic system, and exposing said film-covered surface to the action of gaseous ammonia to form a film having a pH between 4 and 5.

4. In the manufacture of selenium rectifiers, a method of forming a barrier layer in a selenium-coated plate, comprising treating the surface of the selenium coating with the solution of the dioxide of an element taken from the group consisting of selenium and tellurium to which is added an alkali, in such a concentration as to form on the treated surface a film having a pH of between 4 and 5.

5. A method of making a dry plate for use in selenium rectifiers, comprising the steps of providing a metal plate bearing a selenium layer, applying to the surface of said selenium layer a film of a solution of an acid of an element taken from the group consisting of the elements in groups 5 and 6, in the short III period and in the B subgroups of the long periods of the periodic system, exposing said film to the action of an alkali to form therein a salt of the aforementioned acid of a pH between 4 and 5, drying said film, superimposing thereto a conductive layer of a low melting alloy, and electroforming said film.

6. A method of making a dry plate for use in selenium rectifiers, comprising the steps of providing a metal plate bearing a selenium layer, applying to the surface of said selenium layer a film of a solution of the dioxide of an element taken from the group consisting of the elements selenium and tellurium, and exposing said film to the action of an alkali, to bring the pH of said film to a value comprised between 4 and 5, drying said film, superimposing thereto a layer of a low melting alloy, and electroforming said film.

MAC GOODMAN.

REFERENCES CITED

The following references are of record in the file of this patent:

UNITED STATES PATENTS

| Number | Name | Date |
|---|---|---|
| 2,197,497 | Geisler et al. | Apr. 16, 1940 |
| 2,227,827 | Dubar | Jan. 7, 1941 |
| 2,362,545 | Ellis et al. | Nov. 14, 1944 |

FOREIGN PATENTS

| Number | Country | Date |
|---|---|---|
| 522,092 | Great Britain | June 7, 1940 |